US012393360B1

(12) United States Patent
Knight et al.

(10) Patent No.: US 12,393,360 B1
(45) Date of Patent: Aug. 19, 2025

(54) IDENTIFICATION OF STORAGE BACKENDS TO HIGHER-LEVEL PROCESSES TO PERFORM STORAGE VOLUME MANAGEMENT

(71) Applicant: NetApp, Inc., San Jose, CA (US)

(72) Inventors: Clinton Douglas Knight, Apex, NC (US); Alex Cameron Meade, Apex, NC (US); Joseph Eli Webster, Wichita, KS (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/644,943

(22) Filed: Apr. 24, 2024

(51) Int. Cl.
*G06F 3/06* (2006.01)
(52) U.S. Cl.
CPC .......... *G06F 3/0644* (2013.01); *G06F 3/0604* (2013.01); *G06F 3/0683* (2013.01)
(58) Field of Classification Search
CPC ..... G06F 3/0644; G06F 3/0604; G06F 3/0683
See application file for complete search history.

(56) References Cited

U.S. PATENT DOCUMENTS

| 2005/0246397 | A1* | 11/2005 | Edwards | G06F 16/10 |
| 2019/0114117 | A1* | 4/2019 | Patel | G06F 3/065 |
| 2020/0310915 | A1* | 10/2020 | Alluboyina | G06F 11/1469 |
| 2024/0176529 | A1* | 5/2024 | Dawe | G06F 3/0665 |
| 2024/0231706 | A1* | 7/2024 | Matsushita | G06F 3/0608 |

* cited by examiner

*Primary Examiner* — Ryan Bertram (57) ABSTRACT

The technology disclosed herein enables a higher-level process to perform storage volume management with knowledge of a physical storage backend underlying a storage volume. In a particular example, a method includes mounting a storage volume to a computing node of the computing nodes. The storage volume is stored in a storage pool of a plurality of underlying storage pools. The method further includes determining an identifier for the storage pool, receiving a request to duplicate the storage volume, and determining a second identifier for a second storage pool of the plurality of underlying storage pools to which the storage volume will be duplicated. When the second identifier matches the identifier, creating a clone of the storage volume rather than copying the storage volume to the second storage pool.

20 Claims, 9 Drawing Sheets

IDENTIFICATION OF STORAGE BACKENDS TO HIGHER-LEVEL PROCESSES TO PERFORM STORAGE VOLUME MANAGEMENT

TECHNICAL FIELD

Various embodiments of the present technology generally relate to storage volume duplication within storage pools accessible via computing cluster environments. More specifically, some embodiments relate to the identification of storage backends to higher-level process to perform storage volume management.

BACKGROUND

Storage orchestrators bridge between workloads (e.g., applications, virtual machines, containers, etc.) and storage solutions storing data for those workloads. In one example, Astra Trident is an open-source storage orchestrator designed for containerized applications running in Kubernetes pods. Trident acts as a bridge between containerized workloads and various storage solutions, such as ONTAP, Element, and cloud-based offerings like Azure NetApp Files. A storage orchestrator can simplify storage management for workloads by automating tasks like provisioning, attaching, and managing storage volumes.

A core functionality of a storage orchestrator may be storage pool virtualization. Traditionally, applications would need to interact with individual physical storage pools directly. However, the storage orchestrator may virtualize physical pools, presenting the pools as a unified storage resource (i.e., virtualized pool) to applications, such as those executing in a Kubernetes cluster. This simplifies storage management for administrators as the administrators only need to configure the storage orchestrator with the available storage pools. From there, the storage orchestrator handles dynamically allocating storage resources based on the needs of the containerized applications. The virtualized layer empowers users to define storage classes within a platform managing workloads (e.g., Kubernetes). The classes act as blueprints, specifying desired storage characteristics like performance tier or capacity requirements. When a container requests storage, the storage orchestrator leverages these classes to intelligently select and provision storage volumes to the virtualized storage pool. This ensures applications have the storage resources they need to function effectively.

SUMMARY

The technology disclosed herein enables a higher-level process to perform storage volume management with knowledge of a physical storage backend underlying a storage volume. In a particular example, a method includes mounting a storage volume to a computing node of the computing nodes. The storage volume is stored in a storage pool of a plurality of underlying storage pools. The method further includes determining an identifier for the storage pool, receiving a request to duplicate the storage volume, and determining a second identifier for a second storage pool of the plurality of underlying storage pools to which the storage volume will be duplicated. When the second identifier matches the identifier, creating a clone of the storage volume rather than copying the storage volume to the second storage pool.

In another example, a system includes a storage pool of a plurality of storage pools. A first installation of a storage orchestrator virtualizes the storage pool as a first virtualized pool and a second installation of a storage orchestrator virtualizes the storage pool as a second virtualized pool. The system also includes a first computing cluster executing the first installation. The computing cluster is configured to mount a data volume and the data volume is located in the second virtualized pool. The system further includes a data management service configured to determine the first computing cluster is requesting to mount the data volume from the first virtualized pool and clone the data volume to the first virtualized pool from the second virtualized pool in response to a determination that the storage pool underlies the second virtualized pool and the first virtualized pool.

In a further example, a method includes, in a server of a storage orchestrator installation for a cluster containing the computing node and executing on the computing node, receiving a request to mount a storage volume from a pod executing on the computing node and determining the storage volume does not exist in a virtualized storage pool accessible by the computing node. The method also includes determining the storage volume is stored on a storage backend underlying the virtualized storage pool and requesting the storage volume be cloned into the virtualized storage pool.

DETAILED DESCRIPTION

Some storage systems use Redirect-on-Write (ROW) cloning. ROW cloning is a data cloning technique for creating efficient and space-saving replicas of volumes or files. When using ROW cloning to generate a clone, the original data blocks of cloned volume are initially shared between the parent volume and the clone. As modifications are made to the clone, instead of altering the shared data blocks directly, ROW cloning redirects these changes to new blocks. This redirection ensures that the original data remains unchanged, preserving data integrity and consistency. By only storing the modified or new data separately, ROW cloning minimizes storage overhead and maximizes storage efficiency. This approach enables storage systems to optimize resource utilization and streamline data management tasks.

A storage orchestrator like Trident typically does not care which physical storage backends underlie a virtualized storage pool created by an orchestrator installation in a computing cluster. However, if a storage volume is to be duplicated, not knowing the physical storage location of the storage volume may prevent the storage orchestrator from leveraging the benefits of ROW cloning. In particular, a storage management platform, such as ONTAP, may be used to interface with backend storage systems and provide the storage orchestrator with access to the systems. Storage management platforms integrate on-premises, hybrid, and multi-cloud environments, offering features such as high availability, data protection, and scalability. The platforms also tend to support multiple storage protocols, such as NFS (Network File System), SMB (Storage Message Block), and iSCSI (Internet Small Computer Systems Interface), enabling the platforms to serve a wide range of workloads and applications. Even if a storage management platform supports ROW cloning, instructions must be provided to the storage management platform to request a clone be created. For tasks like data backup and versioning, it may be assumed that a clone can be produced in the same physical storage pool. In contrast, for other tasks where the duplicate may be needed on another storage pool, it cannot be assumed that cloning can be performed. As such, for those tasks, the opposite is assumed and the storage management system is directed to create a copy to a storage location rather than create a clone.

The examples below describe a mechanism whereby a storage orchestrator provides identification of the source and destination storage pools for a duplicate storage volume. If the source and destination are the same, then ROW cloning can be used in place of copying the storage volume. While copying the volume may still occur when the source and destination differ, the instances in which cloning can be used instead will still free up resources in the storage systems because ROW clones use less storage space and processing resources to create than copies.

Various embodiments of the present technology provide for a wide range of technical effects, advantages, and/or improvements to computing systems and components. For example, various embodiments may include one or more of the following technical effects, advantages, and/or improvements: 1) the data management service shares identifiers for physical storage pools across clusters that would otherwise be unaware of shared physical storage pools; 2) knowledge of the storage pools enables the data management service 105 to use cloning, instead of copying, when pool identifiers match; and/or 3) data management service 105 uses cloning to conserve additional storage system resources that are needed when copying a storage volume.

Figure 1A:
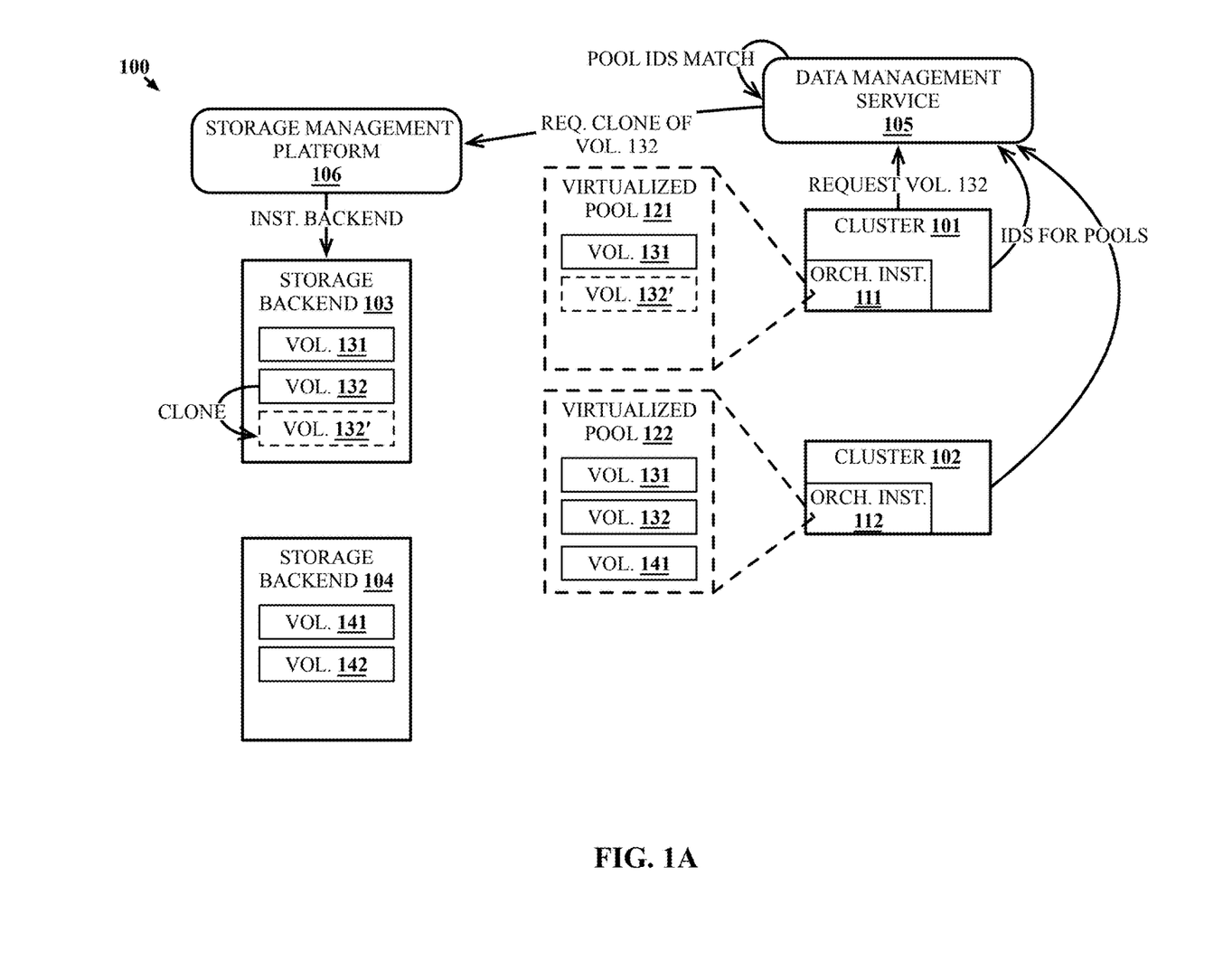
FIGS. 1A-1B illustrate an implementation for identifying storage backends to higher-level processes to perform storage volume management.

FIG. 1A illustrates implementation 100 for identifying storage backends to higher-level processes to perform storage volume management. Implementation 100 includes clusters 101-102, storage backends 103-104, data management service 105, and storage management platform 106. While not shown, components of implementation 100 may communicate over various communication links, which may be direct links or may include intervening systems, networks, and devices. Clusters 101-102 are networks of interconnected computing systems (e.g., servers) that work together to perform processing tasks. Clusters enable efficient allocation of computing resources when distributing workloads across multiple nodes. Distribution of workloads across nodes in a cluster allows for enhanced scalability as demand for those workloads change. Each of storage backends 103-104 is accessed by clusters 101-102 through a defined protocol or interface (e.g., iSCSI, SMB, NFS, etc.), allowing the computing nodes in clusters 101-102 to read and write data stored within. This interaction typically involves the computing nodes sending requests to the storage backend in the storage backend's protocol, which then processes the requests and performs the necessary operations to retrieve or write the data.

Data management service 105 provides centralized management and coordination of orchestrator installations 111-112. Data management service 105 may configure, deploy updates, and otherwise manage orchestrator installations 111-112 across clusters 101-102, ensuring consistent storage provisioning and management operations throughout clusters of the environment. While two clusters are shown in implementation 100, other examples may include more or fewer clusters with orchestrator installations managed by data management service 105. In one example, data management service 105 may be an Astra installation while orchestrator installations 111-112 may be Trident installations. Data management service 105 is shown separately from clusters 101-102 but may be implemented as processes executing on one or more computing nodes in clusters 101-102.

Each of orchestrator installations 111-112 handles establishment of connections to storage backends 103-104 to access underlying storage resources of storage backends 103-104. Orchestrator installations 111-112 simplify the management of storage provisioning and operations within clusters 101-102. Each of orchestrator installations 111-112 may be a Trident installation or may be an installation of some other storage orchestrator where multiple installations thereof are managed by a data management service like data management service 105. Different clusters 101-102 may be used in this example due to different types of workloads being handled by the different clusters 101-102. As such, clusters 101-102 may be located in the same physical data center location but are logically separated. Each of clusters 101-102 receives one of orchestrator installations 111-112 to handle access to storage backend 103 and/or storage backend 104. Although, more or fewer storage backends may exist with which orchestrator installations 111-112 can communicate in other examples.

As part of orchestrator installations 111-112 simplification of storage provisioning and access to computing nodes in clusters 101-102, orchestrator installations 111-112 virtualize the storage backends as virtualized storage pools 121-122. Virtualized storage pool 121 is what orchestrator installation 111 makes available for nodes of cluster 101 to access and virtualized storage pool 122 is what orchestrator installation 112 makes available for nodes of cluster 102 to access. Virtualized storage pool 121 includes storage volume 131 and virtualized storage pool 122 includes storage volume 131, storage volume 132, and storage volume 141. Storage volume 132 and storage volume 142 are present in respective storage backends 103-104 but may not currently be included in virtualized storage pool 121 and virtualized storage pool 122 (e.g., may be included in some other virtualized pool for some other cluster). One benefit of using virtualized storage pools 121-122 is that nodes can access storage backends 103-104 as though they are a single storage volume. The workloads on the nodes do not need to be configured with the protocols and other conventions of each specific storage backend. Rather, orchestrator installations 111-112 handle any translation necessary to communicate with storage backends 103-104. For instance, if a workload in cluster 101 indicates storage volume 131 should be mounted to the computing node executing the workload, a component of orchestrator installation 111 will mount storage volume 131 in virtualized storage pool 121 from the perspective of the workload. The workload has no need to know storage volume 131 is actually being mounted from storage backend 103 since orchestrator installation 111 handles the translation between virtualized storage pool 121 and storage backend 103. For instance, storage backend 103 may be an iSCSI physical storage pool while storage backend 104 may use NFS. Orchestrator installations 111-112 handles any translation needed from workload instructions to iSCSI or NFS depending on where a storage volume is located.

Storage management platform 106 is a unified storage platform that can integrate with on-premises, hybrid, and multi-cloud environments, offering features such as high availability, data protection, and scalability. Storage management platform 106 has the ability to create clones when instructed to do so and may be capable of other data management features like snapshotting, data protection, and disaster recovery. ONTAP is on example of storage management platform 106 but storage management platform 106 may also be an Isilon, HyperFlex, etc. platform.

Typically, when data management service 105 is to duplicate a storage volume, data management service 105 assumes the storage volume is being duplicated from one physical storage pool to another (e.g., from storage backend 103 to storage backend 104 or vice versa). This is because data management service 105 is unaware of the physical location (i.e., physical storage pool) of a storage volume and the physical location to which the storage volume is to be duplicated. Without such knowledge, if those two locations are not the same, cloning a storage volume will not result in a duplicate being accessible from the desired pool. Therefore, orchestrator installations 111-112 generate and share identifiers for the storage pools accessible thereby to data management service 105. Data management service 105 uses the identifiers to determine whether the physical storage pool storing a storage volume is the same physical storage pool to which a duplicate of the storage volume is going to be stored. If the two identified physical storage pools are the same, data management service 105 can clone the storage volume rather than copy the storage volume, which consumes more storage space (i.e., because a full copy will be taking up space in the physical pool) and uses more processing resources to create.

For example, clusters 101-102 each generate identifiers for underlying physical storage pools that are being virtualized by respective virtualized storage pools 121-122. The identifiers may be generated when the physical storage pools are discovered by orchestrator installations 111-112, when particular identifiers are needed for comparison (e.g., in response to a duplication request), or at some other time prior to being used. Orchestrator installations 111-112 provide the generated pool identifiers to data management service 105. When a workload executing on a computing node in cluster 101 requests a duplicate of storage volume 132, orchestrator installation 111 responsively requests data management service 105 for a duplicate of storage volume 132. In the request from orchestrator installation 111 to data management service 105, data management service 105 at least identifies storage volume 132 to data management service 105 and may also provide a destination pool's identifier indicating the physical storage pool to which the duplicate should be stored. Had orchestrator installation 111 simply indicated virtualized storage pool 121, then data management service 105 would still not know whether storage volume 132 can be copied or cloned from its current location. In some examples, orchestrator installation 111 may further provide an indicator of the physical storage pool where storage volume 132 is stored. Alternatively, data management service 105 may already track where storage volume 132 is stored such that data management service 105 can determine the physical storage pool for storage volume 132.

In this example, storage backends 103-104 are two storage pools. As such, a storage pool identifier for storage backend 103 corresponds to storage backend 103 as a whole and a storage pool identifier for storage backend 104 corresponds to storage backend 104 as a whole. In other examples, storage backend 103 may include multiple physical storage pools. For instance, storage backend 103 may be a distributed storage system and each location of the distributed storage system may be considered its own storage pool. Each of those storage pools would include an identifier that distinguishes the storage pool from others. In this example, orchestrator installation 111 is requesting that storage backend 103 store the duplicate of storage volume 132. Storage backend 103 may be the default destination for the duplicate because virtualized storage pool 121 does not include storage backend 104 or, as noted above, orchestrator installation 111 may explicitly indicate storage backend 103 as being the destination for the duplicate of storage volume 132.

In response to receiving the request from orchestrator installation 111, data management service 105 compares the pool identifiers for where storage volume 132 is stored and where the duplicate of storage volume 132 is going to be stored. In this case, storage volume 132 is located in the same physical storage pool, storage backend 103, where the duplicate of storage volume 132 will also be stored. As such, the pool identifiers will match. Even though data management service 105 does not necessarily know any additional detail about storage backend 103, data management service 105 knows storage volume 132 can be cloned due to the pool identifiers being the same. In response to determining the pool identifiers match, data management service 105 communicates with storage management platform 106 to request storage volume 132 be cloned. Then, in response to receiving the clone instruction from data management service 105, storage management platform 106 instructs storage backend 103 to clone storage volume 132, creating storage volume 132', using ROW cloning.

Storage volume 132' is now included in virtualized storage pool 121 for access by the workload requesting the clone of storage volume 132. Before storage volume 132' is included in virtualized storage pool 121, an identifier for storage volume 132' may be created by storage backend 103 and sent directly, or through storage management platform 106/data management service 105, to orchestrator installation 111. Once storage volume 132' is included in virtualized storage pool 121, the workload in cluster 101 can access storage volume 132'. Since storage volume 132' is a ROW clone, storage volume 132' points to storage volume 132 when reading and creates new blocks when data is written to storage volume 132'.

Figure 1B:
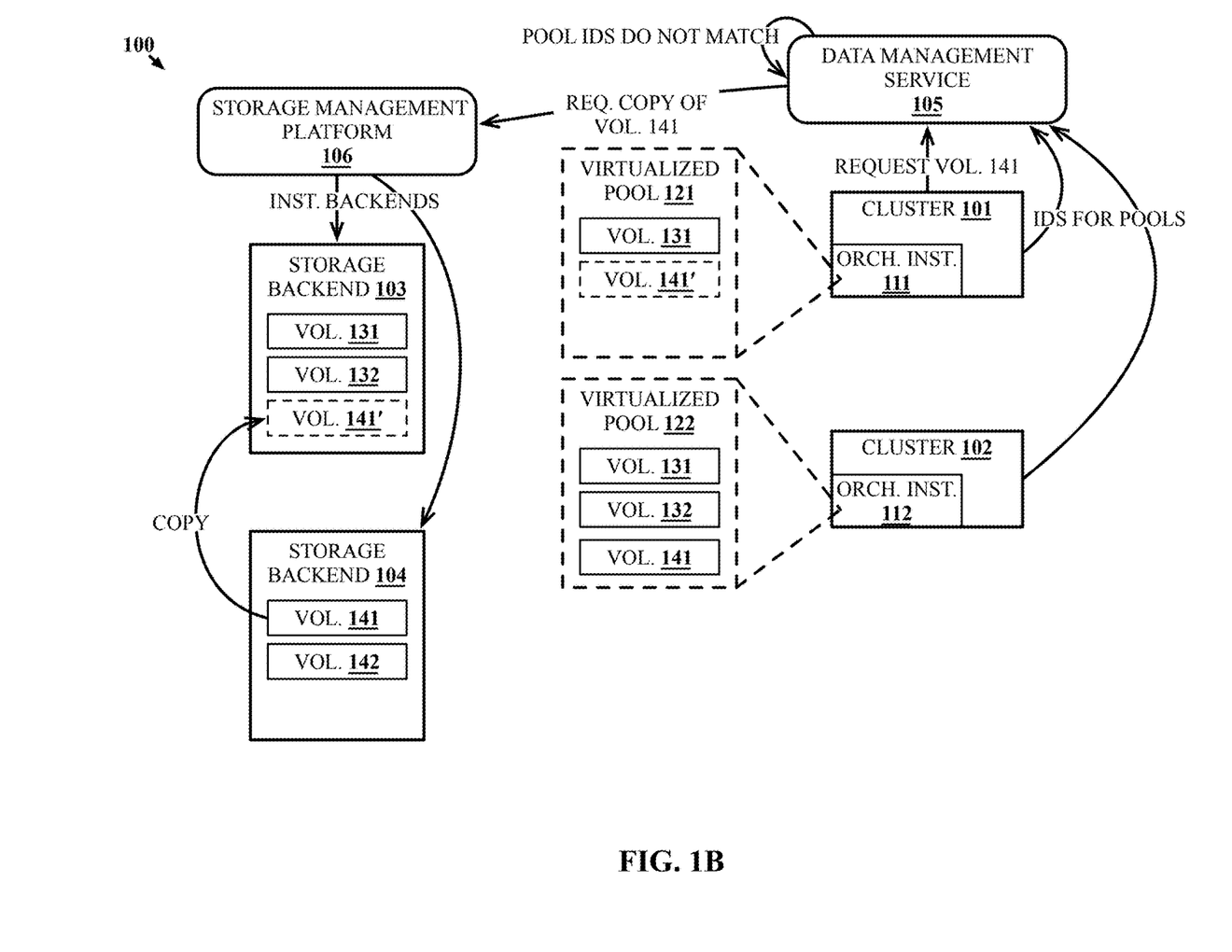

FIG. 1B illustrates another example of implementation 100 for identifying storage backends to higher-level processes to perform storage volume management. In this example, a workload in cluster 101 requests storage volume 141 be duplicated into virtualized storage pool 121. Like storage volume 132' above, the destination physical pool for the duplicate of storage volume 141 is storage backend 103. The duplicate may be destined for storage backend 103 because virtualized storage pool 121 only virtualizes storage backend 103 or the duplicate may be directed to storage backend 103 for some other reason. In this example, virtualized storage pool 122 virtualizes both storage backend 103 and storage backend 104 because virtualized storage pool 122 includes storage volumes from storage backends 103-104 (i.e., storage volume 131, storage volume 132, and storage volume 142). Unlike the example above, data management service 105 determines that the pool identifiers for the source and destination of storage volume 141 do not match, indicating to data management service 105 that storage volume 141 is stored in a different physical pool from where the duplicate will be stored. As such, data management service 105 requests that storage management platform 106 make a copy of storage volume 141 to storage backend 103.

In response to the request from data management service 105, storage management platform 106 communicates with storage backend 103 and storage backend 104 to create a copy, storage volume 141', of storage volume 141. Storage volume 141' may be created by storage backend 104 sending data of storage volume 141 to storage backend 103 directly, through an intermediate system, or through some other inter-system data copying mechanism. Once storage volume 141' is stored in storage backend 103, storage volume 141' can be included in virtualized storage pool 121 by orchestrator installation 111. As was the case with storage volume 132', an identifier for storage volume 141' may be created by storage backend 103 and sent directly, or through storage management platform 106/data management service 105, to orchestrator installation 111. Unlike the clone of storage volume 132, storage volume 141' is a regular storage volume that can be manipulated like any other non-clone storage volume.

Figure 2:
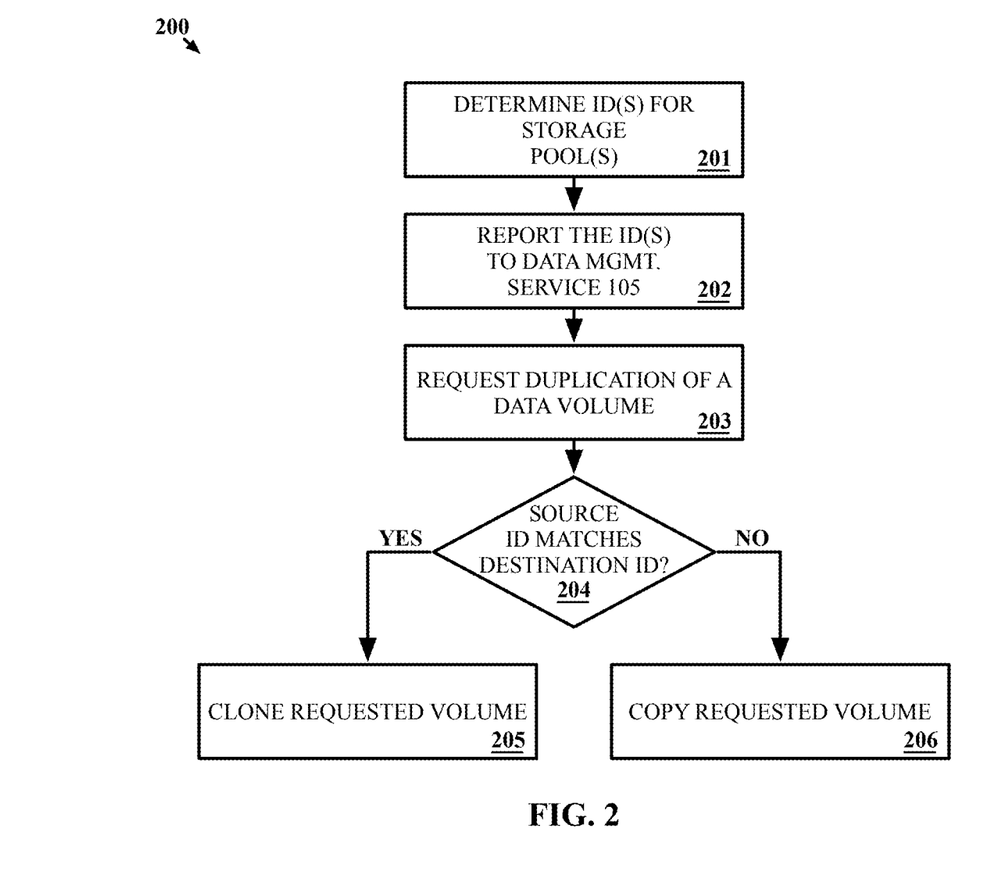
FIG. 2 illustrates an operation to identify storage backends to higher-level processes to perform storage volume management.

FIG. 2 illustrates operation 200 to identify storage backends to higher-level processes to perform storage volume management. In operation 200, orchestrator installations 111-112 determine identifiers for storage pools accessible by their respective clusters 101-102 (step 201). The storage pools may include one or more storage pools in storage backend 103 and/or storage backend 104. A storage pool may be a logical grouping of physical storage media, such as hard disks and solid-state drives, and sometimes referred to as an aggregate. Storage backends 103-104 may each include a single storage pool or may be divided into multiple storage pools. The identifiers may be received from storage backends 103-104, calculated from information received from storage backends 103-104, or determined in some other manner that ensure each identifier distinctly identifies a respective storage pool (e.g., is unique among all possible storage pools orchestrator installations 111-112 may access).

Orchestrator installations 111-112 report the determined identifiers to data management service 105 (step 202). Typically, data management service 105 would have no use for identifiers corresponding to physical storage pools but, in those typical situations, data management service 105 would not have the option to clone a volume rather than copy the volume. After reporting the identifiers, orchestrator installation 111 (or orchestrator installation 112 in other examples) requests duplication of a data volume (e.g., storage volume 132 or storage volume 141 per the examples above) (step 203). The request identifies the storage volume. The request may also include an identifier of the storage pool in which the storage volume is stored. Data management service 105 determines whether the identifier associated with the storage volume matches an identifier of a storage pool virtualized in virtualized storage pool 121 (step 204). That is, data management service 105 received identifiers of storage pools virtualized by virtualized storage pool 121 in step 202 above. Data management service 105 may compare the identifier of the storage pool storing the storage volume with the set of identifiers received from orchestrator installation 111 to check whether there is a match within that set.

If the identifier matches an identifier received from orchestrator installation 111 at step 202, then data management service 105 communicates with storage management platform 106 to clone the requested volume (step 205). The matching identifier indicates to data management service 105 that the storage pool storing the requested volume is also a storage pool that is (or can be) virtualized as part of virtualized storage pool 121. Thus, a ROW clone will conserve resources relative to producing a copy of the storage volume while still presenting to orchestrator installation 111 as a duplicate. If, however, no identifier received from orchestrator installation 111 matches the identifier of the storage pool containing the requested storage volume, then data management service 105 communicates with storage management platform 106 to copy the storage volume to a storage volume that is accessible by orchestrator installation 111 and virtualized as part of virtualized storage pool 121 (step 206). In some examples, orchestrator installation 111 may identify a destination storage pool on which the copy should be stored or data management service 105 may select the storage pool from storage pool virtualized as virtualized storage pool 121.

Figure 3:
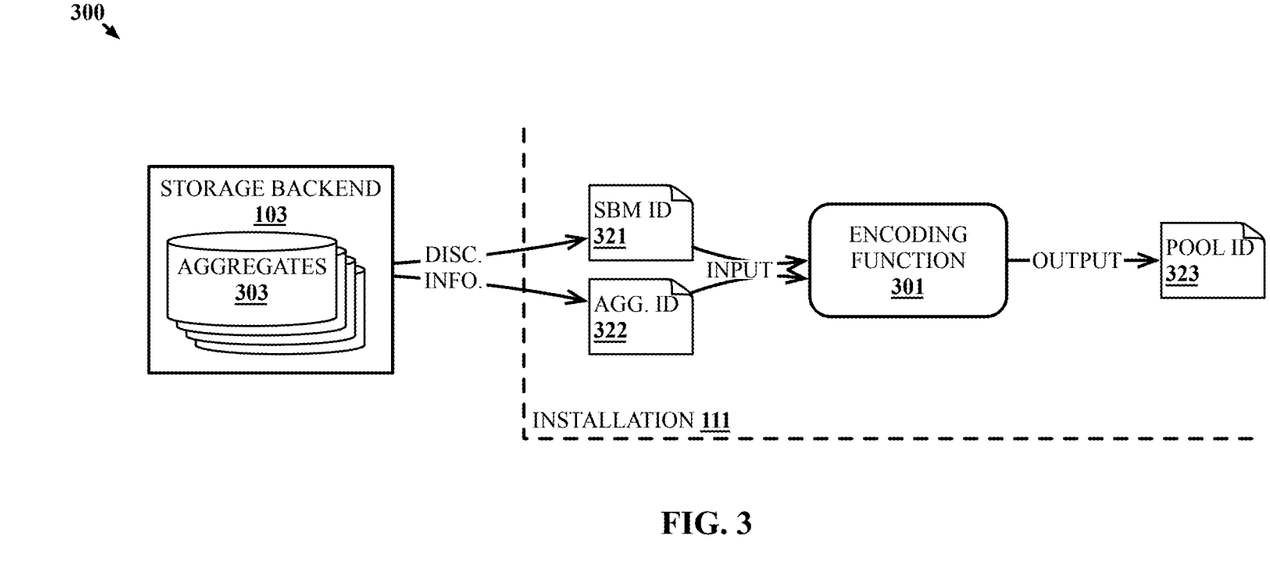
FIG. 3 illustrates an operational scenario for identifying storage backends to higher-level processes to perform storage volume management.

FIG. 3 illustrates operational scenario 300 for identifying storage backends to higher-level processes to perform storage volume management. Operational scenario 300 is an example of how a pool identifier may be determined. Specifically, orchestrator installation 111 includes encoding function 301 which encodes information received about respective storage pools into identifiers for the respective storage pools. The encoding function may be any algorithm that transforms information into an identifier that can be compared to other generated identifiers. The encoding function may be reversible to recreate the input data from the identifier produced but reversibility is not necessary. In one example, encoding function 301 may use Base64 encoding, which converts binary data into a string of characters selected from a set of 64 American Standard Code for Information Interchange (ASCII) characters. The resulting character string may be the identifier for a storage pool or further manipulation of the characters may be performed prior to settling on an identifier.

In this example, an identifier for storage backend 103, specifically a Storage Backend Management (SBM) identifier 321, and aggregate identifier 322 for a particular aggregate of aggregates 303 are used as input. SBM identifier 321 and aggregate identifier 322 may be discovered by orchestrator installation 111 from storage backend 103 through a discovery process defined by the storage access protocol used by storage backend 103 (e.g., iSCSI). SBM identifier 321 and aggregate identifier 322 are processed by encoding function 301 to generate storage pool identifier 323. Thus, storage pool identifier 323 represents a particular physical storage pool that includes the aggregate having aggregate identifier 322 within storage backend 103.

If orchestrator installation 111 is also able to access one or more aggregates in storage backend 104, orchestrator installation 111 will similarly discover information from storage backend 104. In those cases, SBM identifier 321 will be replaced with an SBM identifier of storage backend 104. The SBM identifier for storage backend 104 will be fed into encoding function 301 with respective aggregate identifiers of aggregates in storage backend 104 that are accessible to orchestrator installation 111. Additionally, while operational scenario 300 is described from the perspective of orchestrator installation 111, orchestrator installation 112 performs similar operations to generate pool identifiers for those of aggregates 303 and aggregates in storage backend 104 to which orchestrator installation 112 has access. Orchestrator installation 112 uses the same encoding function 301 to generate the pool identifiers because, if both orchestrator installations 111-112 has access to the same storage pool, the pool identifier generated for that storage pool must be the same from both orchestrator installations 111-112. Since the input information received about the aggregate will be the same, using the same encoding function 301 results in the same pool identifier output.

Figure 4:
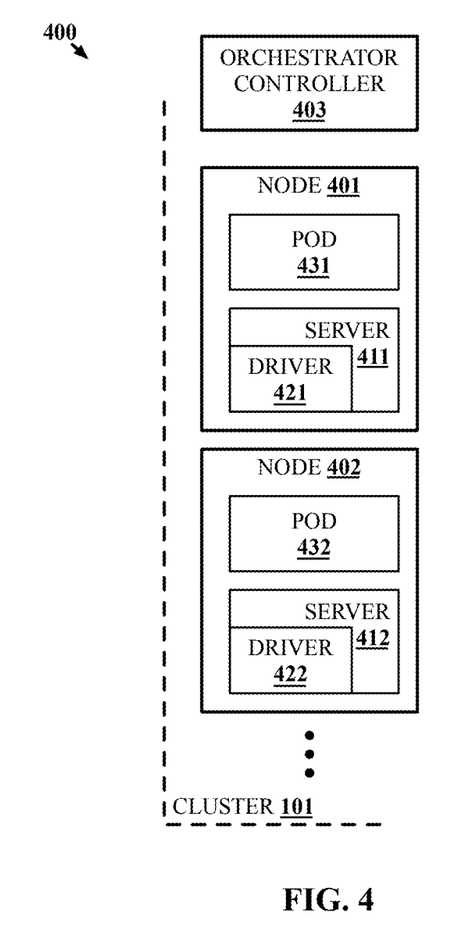
FIG. 4 illustrates an implementation for identifying storage backends to higher-level processes to perform storage volume management.

FIG. 4 illustrates implementation 400 for identifying storage backends to higher-level processes to perform storage volume management. Implementation 400 is an example of components included in cluster 101. Specifically, implementation 400 includes computing nodes 401-402 and orchestrator controller 403. Only two computing nodes are shown for cluster 101 but any number of computing nodes may be supported by cluster 101. Computing nodes 401-402 may each be a standalone unit equipped with processing power, memory, and storage, capable of executing tasks independently (e.g., a server computer). Computing nodes 401-402 collaborate within cluster 101 to distribute, perform, and otherwise manage workloads.

In this example, the workloads executed by computing nodes 401-402 are respective pods 431-432. A pod is the smallest deployable unit in a Kubernetes cluster and includes one or more containers that share resources, such as networking and storage, on a computing node. Pods 431-432 are managed collectively by Kubernetes (not shown) and serve as the basic building blocks for scalable application. Kubernetes assigned pods 431-432 to their respective computing nodes 401-402 and may assign additional pods to additional computing nodes of cluster 101 should additional capacity be required. Workloads may be implemented as other types of processes (e.g., native applications, containers, virtual machines, etc.) in other examples.

Computing node 401 also executes orchestrator server 411 while computing node 402 executes orchestrator server 412. Orchestrator servers 411-412 are components of orchestrator installation 111. Orchestrator controller 403 is also a component of orchestrator installation 111. Orchestrator controller 403 may execute as a process on one or more computing nodes in cluster 101 or may execute on a dedicated computing system. Orchestrator controller 403 functions as the orchestrator for data management tasks within the Kubernetes environment of cluster 101, facilitating seamless interaction between pods 431-432 and orchestrator servers 411-412. When pod 431 or pod 432 requires access to data stored on storage backends 103-104 managed by orchestrator installation 111, the pod sends a request to orchestrator controller 403 specifying the required data and desired actions. Orchestrator controller 403 then coordinates with orchestrator servers 411-412, which are responsible for executing the data operations on the underlying storage infrastructure of storage backends 103-104. Through this orchestration process, orchestrator controller 403 ensures that pods 431-432 can efficiently access and manipulate data while adhering to defined access controls, storage policies, and performance requirements.

Orchestrator servers 411-412 include respective storage drivers 421-422. Storage drivers 421-422 server as a bridge between pods 431-432 and storage backends 103-104, enabling seamless interaction and data management. Essentially, a storage driver translates high-level commands and requests from pods into instructions that storage backend 103 and/or storage backend 104 can understand and execute. By leveraging specific APIs (Application Programming Interfaces) and protocols supported by different storage vendors, the storage driver ensures compatibility and interoperability across a wide range of storage platforms. Thus, even if storage backends 103-104 are from different vendors and use different protocols, storage drivers 421-422 ensure data stored thereon can be accessed by pods 431-432.

Figure 5:
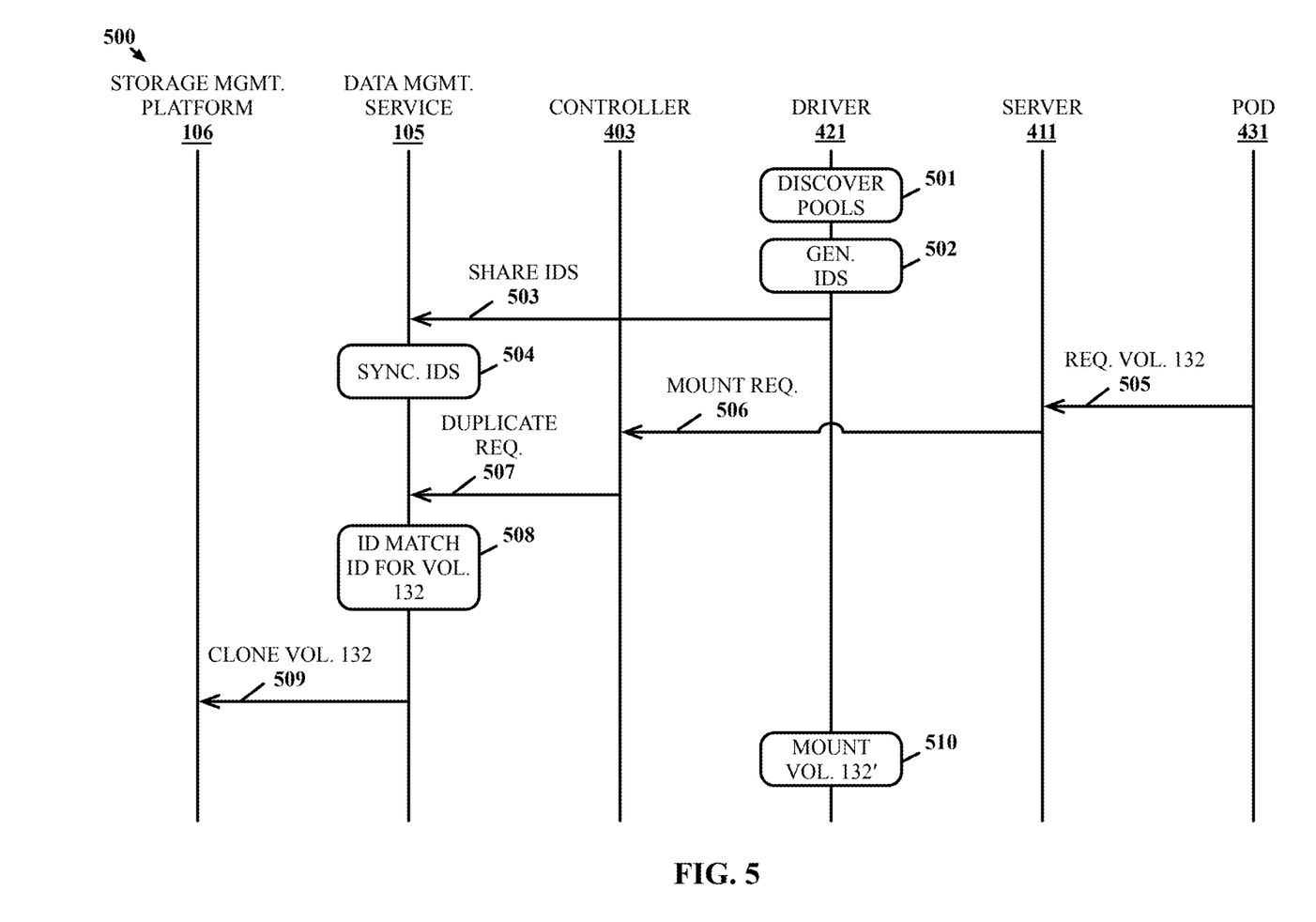
FIG. 5 illustrates an operational scenario for identifying storage backends to higher-level processes to perform storage volume management.

FIG. 5 illustrates operational scenario 500 for identifying storage backends to higher-level processes to perform storage volume management. In operational scenario 500, storage driver 421 discovers storage pools (step 501). Storage driver 421 may employ a process of dynamic detection and configuration. Initially, storage driver 421 may leverage predefined or user-configured parameters to scan the network for storage backends 103-104 and available storage pools therein. This scanning process involves querying storage backends 103-104 to identify pools of storage capacity (e.g., aggregates) that can be allocated for use. Once identified, storage driver 421 collects relevant metadata and characteristics of each storage pool, including capacity, performance capabilities, redundancy levels, and access protocols. Storage driver 421 further collects information necessary to create identifiers for each discovered storage pool, which include SBM identifiers and aggregate identifiers in this example. Storage driver 421 may stop after performing an initial discovery (e.g., a first discovery upon being run) or storage driver 421 may continue to monitor (e.g., periodically) for additional storage pools (and backends) that come available or are removed during execution of storage driver 421 (i.e., rediscovers storage backends). These discovered pools are examples of pools virtualized as virtualized storage pool 121 by orchestrator installation 111.

Storage driver 421 generates pool identifiers from the SBM identifiers and aggregate identifiers received during discovery (step 502). The pool identifiers may be produced using encoding function 301 as described above. The pool identifiers are transmitted to data management service 105 after generation (step 503). Transmitting the pool identifiers to data management service 105 informs data management service 105 of the storage pools accessible by storage driver 421. In some examples, data management service 105 may synchronize the pool identifiers received from storage driver 421 with other drivers under control of data management service 105 (e.g., other drivers in cluster 101, such as storage driver 422, and/or drivers running on computing nodes in cluster 102 so that drivers in cluster 102 are aware of the storage pools available to cluster 101 without having to query data management service 105) (step 504).

After discovering storage backends, pod 431 requests that orchestrator server 411 mount a copy of storage volume 132 (step 505). To make the request, pod 431 may issue a Kubernetes Persistent VolumeClaim (PVC), specifying a volume identifier for storage volume 132. Pod 431 may be preprogrammed to request storage volume 132 or may be configured to determine storage volume 132 should be mounted during execution (e.g., based on information received from other pods in cluster 101). In response to the request from pod 431, orchestrator server 411 communicates with orchestrator controller 403 to request mounting of a copy of storage volume 132 (step 506). Storage volume 132 is not currently included in the storage volumes accessible by orchestrator installation 111 so orchestrator controller 403 passes a request to duplicate storage volume 132 into a storage pool accessible by storage driver 421 (step 507).

Upon receiving the duplication request, data management service 105 determines the pool identifier for the storage pool storing storage volume 132 matches a pool identifier accessible by storage driver 421 (step 508). Data management service 105 may keep an index of storage volumes in association with pool identifiers associated therewith, data management service 105 may query orchestrator installation 112 for a pool identifier of a pool storing storage volume 132, or data management service 105 may obtain the pool identifier associated with storage volume 132 in some other manner. Data management service 105 compares the pool identifier associated with storage volume 132 to the pool identifiers received from storage driver 421 to recognize the pool identifier matches with one of the pool identifiers received from storage driver 421. In response to finding a match, data management service 105 directs storage management platform 106 to create a ROW clone, storage volume 132', of storage volume 132 (step 509). To create the clone, storage management platform 106 may simply require the volume identifier for storage volume 132 and locates storage volume 132 in storage backend 103 based on the volume identifier. Storage volume 132' is then mounted by storage driver 421 for access by pod 431 (step 510). While storage volume 132' is a clone of storage volume 132, for all intents and purposes, pod 431 can interact with storage volume 132' as though it is a full copy.

Figure 6:
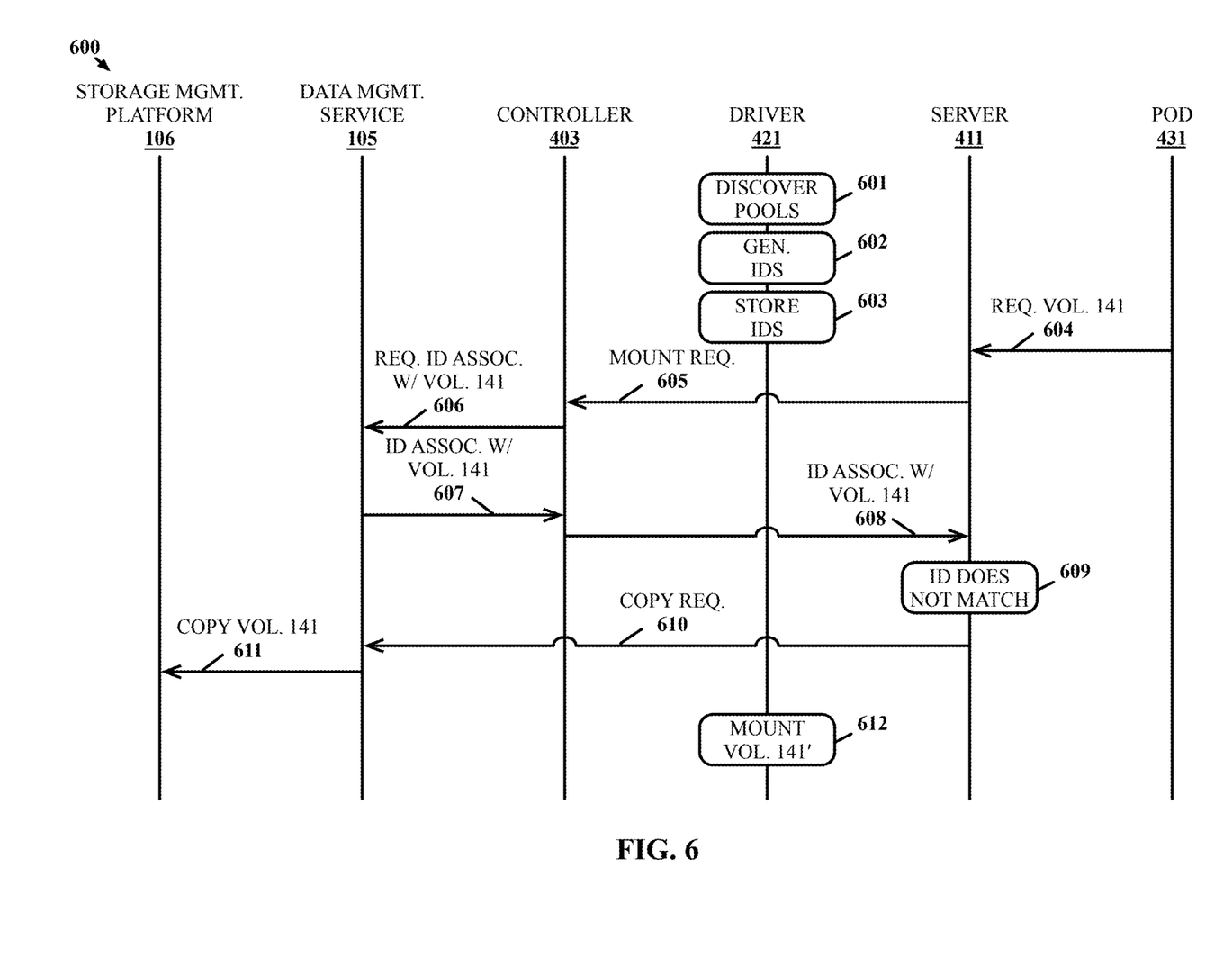
FIG. 6 illustrates an operational scenario for identifying storage backends to higher-level processes to perform storage volume management.

FIG. 6 illustrates operational scenario 600 for identifying storage backends to higher-level processes to perform storage volume management. Operational scenario 600 begins similarly to operational scenario 500 with storage driver 421 discovering storage pools (step 601). Pool identifiers for the storage pools are generated from information obtained during the discovery process (step 602). In this example, the pool identifiers are stored locally at computing node 401 by storage driver 421, although, the pool identifiers may also be sent to data management service 105 like in operational scenario 500 (step 603).

In this example, pod 431 requests a duplicate of storage volume 141 be mounted by orchestrator server 411 (step 604). The request may identify storage volume 141 to orchestrator server 411 using a volume identifier for storage volume 141. In response to the request from pod 431, orchestrator server 411 communicates with orchestrator controller 403 to request mounting of a copy of storage volume 141 (step 605). In this example, rather than passing the copy request to data management service 105 to determine whether to copy or clone storage volume 141, orchestrator controller 403 requests the storage pool identifier corresponding to the storage pool on which storage volume 141 is stored (step 606). In response to the request, data management service 105 may reference an index of storage volumes in association with pool identifiers associated therewith, data management service 105 may query orchestrator installation 112 for a pool identifier of a pool storing storage volume 141, or data management service 105 may obtain the pool identifier associated with storage volume 141 in some other manner. Data management service 105 passes the pool identifier associated with storage volume 141 to orchestrator controller 403 in response to the request from orchestrator controller 403 (step 607). Orchestrator controller 403 likewise passes the pool identifier to orchestrator server 411 in response to the mounting request (step 608).

Once orchestrator server 411 has received the pool identifier for storage volume 141, orchestrator server 411 compares the identifier to pool identifiers stored by storage driver 421 to determine the pool identifier for storage volume 141 does not match any identifier stored by storage driver 421 (step 609). As such, a clone of storage volume 141 will not be accessible to storage driver 421 just like the original storage volume 141 is not accessible by storage driver 421. Orchestrator server 411 requests data management service 105 have a copy created of storage volume 141 to a storage pool that is accessible by storage driver 421 (step 610). In the copy request, orchestrator server 411 may identify one or more storage pools to which the copy of storage volume 141 should be stored. If multiple storage pools are identified by orchestrator server 411, data management service 105 may select one of the storage pools. Data management service 105 then instructs storage management platform 106 to create a copy, storage volume 141', of storage volume 141 in the storage pool indicated in the instruction (step 611). Once storage volume 141' is in a storage pool accessible by storage driver 421, storage driver 421 mounts storage volume 141' for access by pod 431 (step 612).

It should be understood that the above scenarios are merely examples of what may occur to achieve the desired results of cloning storage volumes when pool identifiers match. Data management service 105 being higher level than orchestrator installations 111-112 enables data management service 105 to be a broker of pool identifiers between clusters 101-102. Whether data management service 105 compares the identifiers, as occurred in operational scenario 500, orchestrator server 411 compares the identifiers, as occurred in operational scenario 600, or some other component compares the identifiers, data management service 105 is still in the path through which the pool identifiers are exchanged between clusters 101-102 for comparison.

Figure 7:
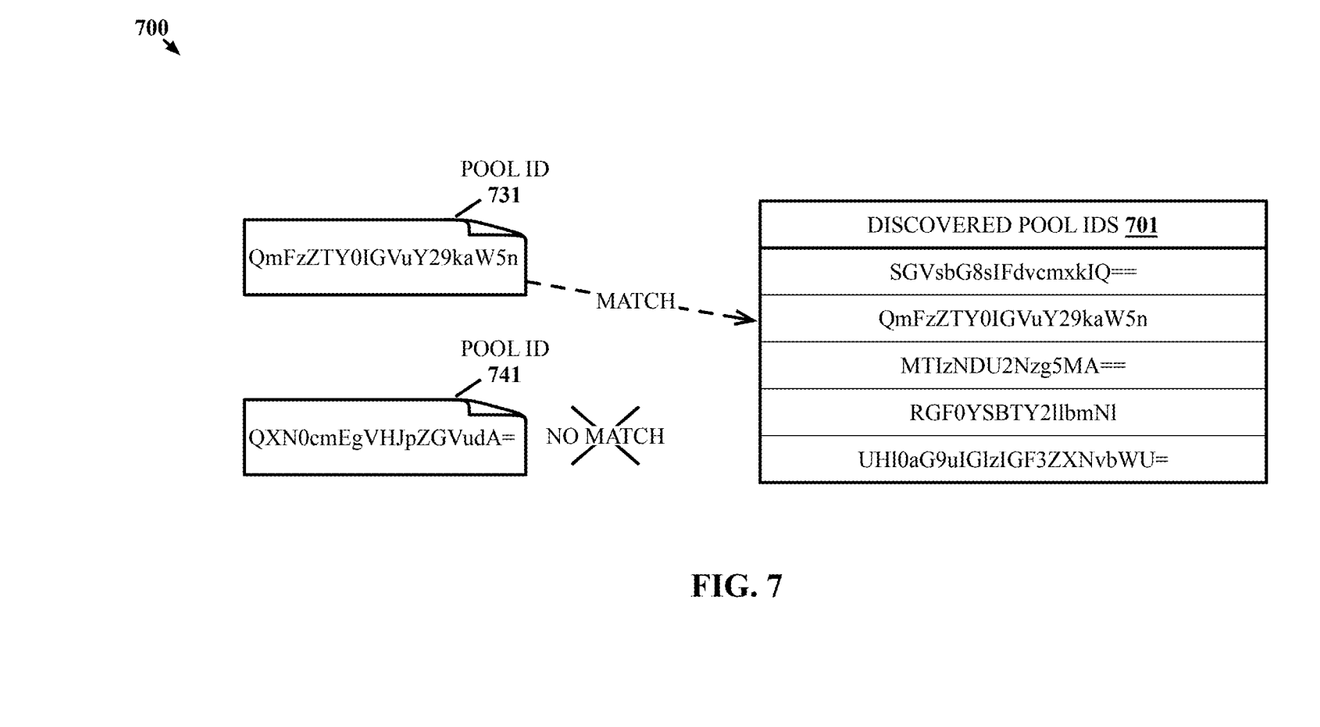
FIG. 7 illustrates an operational scenario for identifying storage backends to higher-level processes to perform storage volume management.

FIG. 7 illustrates an operational scenario 700 for identifying storage backends to higher-level processes to perform storage volume management. In operational scenario 700, discovered pool identifiers 701 is an example of pool identifiers generated by storage driver 421 from storage pools discovered during the discovery process described in operational scenarios 500-600. In this case, five pools were discovered, and five corresponding pool identifiers were generated. Also in operational scenario 700 are pool identifier 731, which is an example pool identifier for a storage pool storing storage volume 131, and pool identifier 741, which is an example pool identifier for a storage pool storing storage volume 141. Consistent with the examples above, pool identifier 731 matches one of discovered pool identifiers 701 indicating storage volume 131 can be cloned instead of copied. Conversely, pool identifier 741 does not match any of discovered pool identifiers 701 indicating storage volume 141 will need to be copied to one of the storage pools corresponding to discovered pool identifiers 701.

Figure 8:
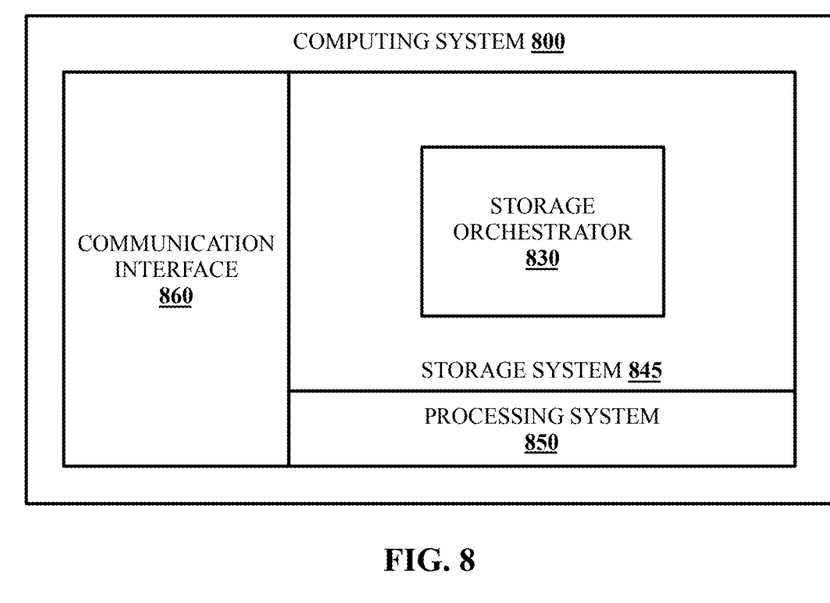
FIG. 8 illustrates a computing system for identifying storage backends to higher-level processes to perform storage volume management.

FIG. 8 illustrates a computing system 800 for identifying storage backends to higher-level processes to perform storage volume management. Computing system 800 is representative of any computing system or systems with which the various operational architectures, processes, scenarios, and sequences disclosed herein can be implemented. Computing system 800 is an example architecture for computing nodes of clusters 101-102, such as computing nodes 401-402, and computing systems executing data management service 105 and storage management platform 106, although other examples may exist. Computing system 800 includes storage system 845, processing system 850, and communication interface 860. Processing system 850 is operatively linked to communication interface 860 and storage system 845. Communication interface 860 may be communicatively linked to storage system 845 in some implementations. Computing system 800 may further include other components such as a battery and enclosure that are not shown for clarity.

Communication interface 860 comprises components that communicate over communication links, such as network cards, ports, radio frequency (RF), processing circuitry and software, or some other communication devices. Communication interface 860 may be configured to communicate over metallic, wireless, or optical links. Communication interface 860 may be configured to use Time Division Multiplex (TDM), Internet Protocol (IP), Ethernet, optical networking, wireless protocols, communication signaling, or some other communication format-including combinations thereof. Communication interface 860 may be configured to communicate with other computing systems via one or more networks.

Processing system 850 comprises microprocessor and other circuitry that retrieves and executes operating software from storage system 845. Storage system 845 may include volatile and nonvolatile, removable, and non-removable media implemented in any method or technology for storage of information, such as computer readable instructions, data structures, program modules, or other data. Storage system 845 may be implemented as a single storage device but may also be implemented across multiple storage devices or sub-systems. Storage system 845 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no interpretations would storage media of storage system 845, or any other computer-readable storage medium herein, be considered a transitory form of signal transmission (often referred to as "signals per se"), such as a propagating electrical or electromagnetic signal or carrier wave.

Processing system 850 is typically mounted on a circuit board that may also hold the storage system. The operating software of storage system 845 comprises computer programs, firmware, or some other form of machine-readable program instructions. The operating software of storage system 845 comprises storage orchestrator 830. The operating software on storage system 845 may further include an operating system, utilities, drivers, network interfaces, applications, or some other type of software. When read and executed by processing system 850 the operating software on storage system 845 directs computing system 800 to network routing advertisements as described herein. Storage orchestrator 830 may execute natively on processing system 850 or the operating software may include virtualization software, such as a hypervisor, to virtualize computing hardware on which storage orchestrator 830 executes.

In at least one example, storage orchestrator 830 executes on processing system 850 and directs processing system 850 to receive a request to mount a storage volume from a pod executing on computing system 800 and determine the storage volume does not exist in a virtualized storage pool accessible by the computing system 800. Storage orchestrator 830 further directs processing system 850 to determine the storage volume is stored on a storage backend underlying the virtualized storage pool and request the storage volume be cloned into the virtualized storage pool.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for identifying underlying storage pools accessible by computing nodes, the method comprising:
    mounting a storage volume to a computing node of the computing nodes, wherein the storage volume is stored in a storage pool of a plurality of underlying storage pools;
    determining an identifier for the storage pool;
    receiving a request to duplicate the storage volume;
    determining a second identifier for a second storage pool of the plurality of underlying storage pools to which the storage volume will be duplicated; and
    when the second identifier matches the identifier, creating a clone of the storage volume rather than copying the storage volume to the second storage pool.

2. The method of claim 1, wherein the second identifier matching the identifier indicates the second storage pool is the same as the storage pool and physical storage in the storage pool is the same.

3. The method of claim 1, wherein determining the identifier comprises:
    identifying a Storage Backend Management (SBM) identifier of the storage pool and an aggregate identifier within the storage pool; and
    inputting the SBM identifier and the aggregate identifier into an encoding function, wherein the encoding function outputs the identifier.

4. The method of claim 1, comprising:
    mounting the clone to a second computing node of the computing nodes, wherein the second node writes data to the clone, wherein the storage pool redirects the data to a new block corresponding to the clone.

5. The method of claim 1, comprising:
    receiving a second request to duplicate the storage volume;
    determining third identifier for a third storage pool of the plurality of underlying storage pools to which the storage volume will be duplicated; and
    when the third identifier does not match the identifier, creating a copy of the storage volume to the third storage pool.

6. The method of claim 1, wherein determining the identifier comprises:
    during initiation of a storage driver at the computing node, discovering the plurality of underlying storage pools;
    creating identifiers, including the identifier, for the plurality of underlying storage pools from information discovered about the plurality of underlying storage pools; and
    reporting the identifiers to a controller.

7. The method of claim 6, wherein determining the identifier comprises:

after a period, rediscovering the plurality of underlying storage pools;
updating the identifiers; and
after updating the identifiers, reporting the identifier to the controller, wherein the controller updates the identifiers with a data management service.

8. The method of claim 6, wherein the controller coordinates storage between installations of a storage orchestrator, the computing node is part of a first installation of the installations, and the request is received in response to a mounting request from a second computing node of the computing nodes that is part of a second installation of the installations.

9. The method of claim 8, comprising:
synchronizing the identifiers across storage drivers of the computing nodes including to a second storage driver at the second computing node, wherein the second storage driver determines the second identifier matches the identifier based on the identifiers.

10. A system for accessing storage volumes, the system comprising:
a storage pool of a plurality of storage pools, wherein a first installation of a storage orchestrator virtualizes the storage pool as a first virtualized pool and a second installation of a storage orchestrator virtualizes the storage pool as a second virtualized pool;
a first computing cluster executing the first installation, wherein the computing cluster is configured to mount a data volume, wherein the data volume is located in the second virtualized pool; and
a data management service configured to determine the first computing cluster is requesting to mount the data volume from the first virtualized pool and clone the data volume to the first virtualized pool from the second virtualized pool in response to a determination that the storage pool underlies the second virtualized pool and the first virtualized pool.

11. The system of claim 10, comprising:
the first computing cluster configured to mount the data volume to a computing node of the first computing cluster from the first virtualized pool after the data volume is cloned to the first virtualized pool; and
after the data volume is mounted, the computing node configured to access data in the data volume, wherein the storage pool handles modifications to the data volume such that data is not modified in the second virtualized pool.

12. The system of claim 11, comprising:
a second computing cluster executing the second installation configured to mount the data volume to a second computing node of the second computing cluster from the second virtualized pool; and
after mounting the data volume, the second computing node configured to access data in the data volume, wherein the storage pool handles modifications to the data volume such that data is not modified in the first virtualized pool.

13. The system of claim 10, comprising:
a second storage pool of the plurality of storage pools, wherein a third installation of the storage orchestrator virtualizes the second storage pool as a third virtualized pool;
a third computing cluster executing the third installation, wherein the third computing cluster is configured to mount a data volume; and the data management service configured to determine the third computing cluster is requesting to mount the data volume from third virtualized pool and copy the data volume to the third virtualized pool in response to a determination that the second storage pool underlies the third virtualized pool.

14. The system of claim 10, comprising:
the data management service configured to determine a first identifier associated with the first virtualized pool matches a second identifier associated with the second virtualized pool, wherein matching identifiers indicates a same storage pool underlies the first virtualized pool and the second virtualized pool.

15. The system of claim 14, comprising:
the first computing cluster configured to compute the first identifier using an encoding function and share the first identifier with the data management service; and
a second computing cluster executing the second installation configured to compute the second identifier using the encoding function and share the second identifier with the data management service.

16. The system of claim 10, comprising:
a computing node of the first computing cluster configured to execute a pod, wherein the computing node executes a server of the first installation, and wherein the pod requests the server mount the storage volume to the computing node.

17. A method for mounting storage volumes to a computing node, comprising:
in a server of a storage orchestrator installation for a cluster containing the computing node and executing on the computing node:
receiving a request to mount a storage volume from a pod executing on the computing node;
determining the storage volume does not exist in a virtualized storage pool accessible by the computing node;
determining the storage volume is stored on a storage pool underlying the virtualized storage pool; and
requesting the storage volume be cloned into the virtualized storage pool.

18. The method of claim 17, wherein determining the storage volume is stored on the storage pool comprises:
in a storage driver for the server, calculating an identifier for the storage pool and storing the identifier in the storage driver and comparing the identifier to another identifier calculated for another virtualized storage pool storing the storage volume.

19. The method of claim 18, wherein requesting the storage volume be cloned comprises:
in the storage driver, requesting a storage management platform clone the storage volume on the storage pool;
mounting a clone of the storage volume from the storage pool to the computing node; and
translating access requests from a workload on the computing node to access requests for the storage pool to access the clone.

20. The method of claim 17, comprising:
determining a different storage volume is stored on a different storage pool; and
requesting the different storage volume be copied to the virtualized storage pool on the storage pool.

* * * * *